Aug. 7, 1956  C. C. S. LE CLAIR  2,757,645
FLUID MOTOR FOR RECIPROCATING GREASE PUMPS
Filed May 23, 1951  5 Sheets-Sheet 2

Inventor:
Camille Clare Sprankling Le Clair
By
Ahlberg, Hupper & Gradolph
Attorneys.

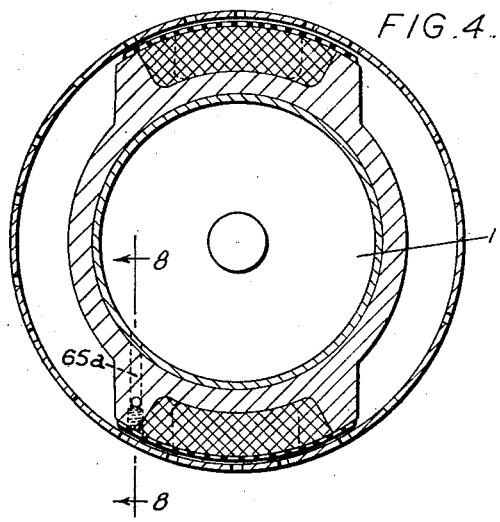
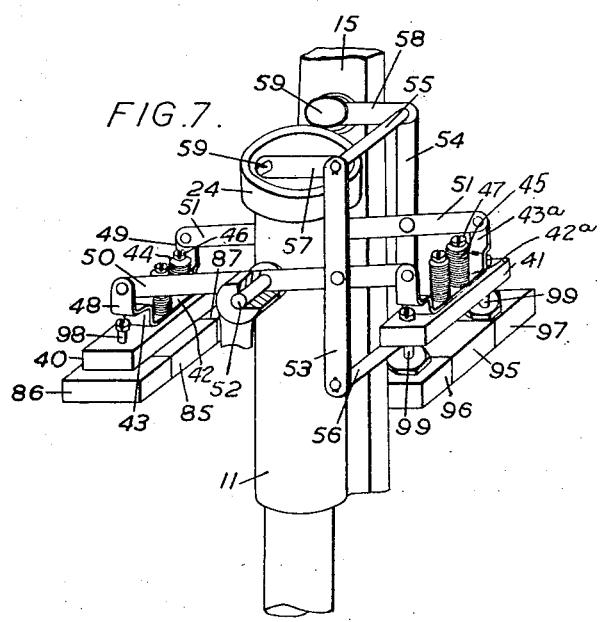

Aug. 7, 1956 — C. C. S. LE CLAIR — 2,757,645
FLUID MOTOR FOR RECIPROCATING GREASE PUMPS
Filed May 23, 1951 — 5 Sheets-Sheet 4

Inventor:
Camille Clare Sprankling Le Clair
By Ahlberg, Hupper & Gradolph
Attorneys.

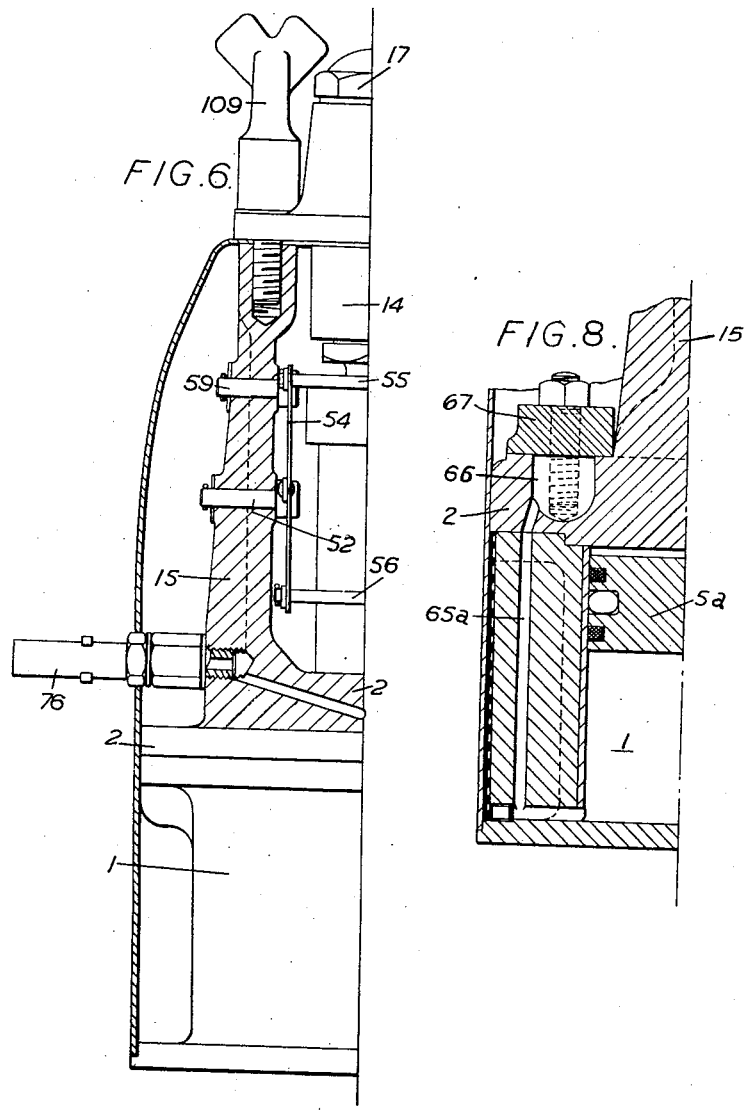

# United States Patent Office 2,757,645
Patented Aug. 7, 1956

2,757,645
FLUID MOTOR FOR RECIPROCATING GREASE PUMPS

Camille Clare Sprankling Le Clair, Crabtree, Plymouth, England, assignor to Tecalemit Limited, Brentford, England Application May 23, 1951, Serial No. 227,762

10 Claims. (Cl. 121—148)

This invention relates in general to reciprocating grease or oil or other liquid pumps of the type which are actuated by fluid-operated motors. The invention is particularly applicable to pumps of the type referred to above which are used to pump grease or oil or other liquid from containers or drums and comprise drum tubes which extend downwardly from below the air-motor into the drum and are provided with openings through which grease or oil or other liquid can pass from the interior of the drum when the pump is in operation. Hereinafter, for brevity, such pumps will be referred to as "grease pumps," and grease or oil or other liquid will be referred to as "grease."

In known pumps of the above mentioned type the moving pump elements are directly coupled to the piston of an air-motor, which either includes a flat or piston-type fluid-control valve. As such pumps have to stall when the grease outlet is closed the valve gear must have a snap action, the characteristic of which is that when the valve operating member has been pushed over dead centre by the air-motor piston rod, it continues its travel under spring action and completes the change-over of the valve gear.

One object of the present invention is to provide a reciprocating pump of the type referred to comprising a high pressure pump which is arranged at the top of the apparatus instead of at the bottom of the grease suction or drum tube.

A further object of the invention is to provide a reciprocating pump of the type referred to which comprises a low pressure grease valve which also functions as a release valve and which presents a relatively long leakage path for grease and is not easily prevented from closing by the presence of foreign bodies in the grease.

Another object of the invention is to replace the usual spring-controlled fluid-motor slide valve gear by a magnetically-operated valve gear, which avoids the use of precision-made slide valves and glands and which has an inherent snap action due to the characteristics of magnetic fields.

And a further object is to provide a new and improved drum pump having a fluid motor, the operation of which is controlled by a magnetically operated valve gear wherein the operation of the latter is controlled by reciprocation of a pump part.

Other objects and advantages will become apparent from the following description taken in conjunction with the accompanying drawings, wherein:

Fig. 4 is a section on the line 4—4 in Fig. 3;

Fig. 6 is a half section on the line 6—6 in Fig. 1, with parts shown in elevation;

Fig. 7 is an isometric view of the linkage connecting the two short-circuiting armatures; and Fig. 8 is a section on the line 8—8 in Fig. 4.

Figure 1:
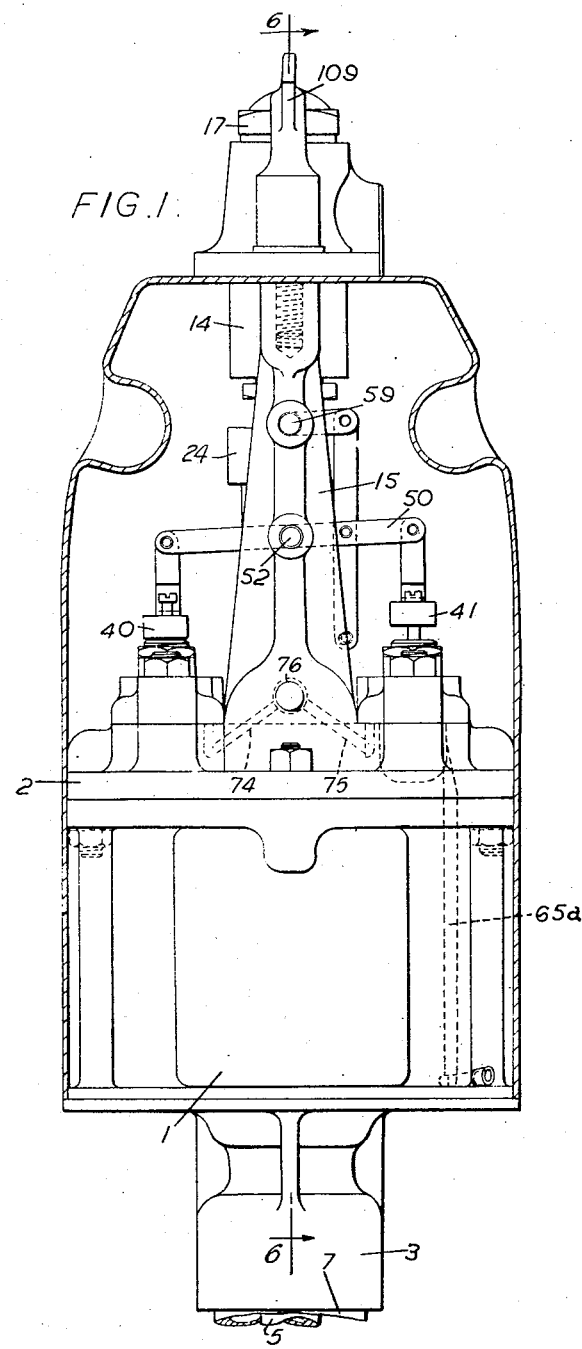
Fig. 1 is an outside elevation of part of the pump, with the enclosing housing structure shown in section.

Referring to the drawings:

This pump comprises an air-motor cylinder 1 which is closed by a top cover 2. The base of the cylinder has a central, downwardly-projecting boss 3 which is bored to provide a guide 4 for a hollow air-motor piston rod 5 and is counterbored and threaded at 6 to receive the upper end of a drum-tube or low pressure cylinder 7 which, when the apparatus is in its operative position, extends downwards through the drum (not shown) containing the lubricant.

Figure 5:
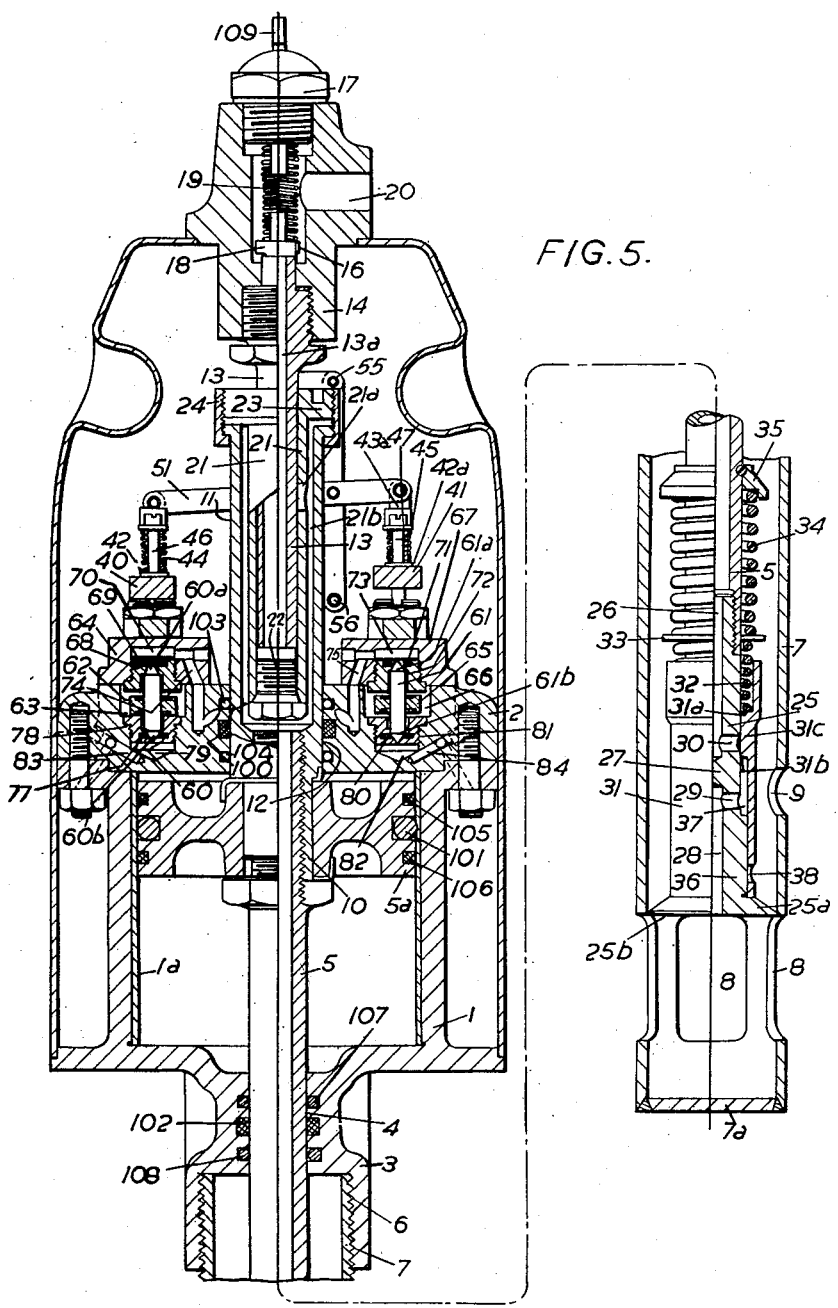
Fig. 5 is a section on the line 5—5 in Fig. 2.

The bottom end of the low pressure cylinder 7 is closed and above the base the cylinder is formed with a number of grease inlet ports 8, Fig. 5, while above the latter the cylinder is formed with at least one relief port 9.

The upper end of the piston rod 5 is fixed in the sleeve end 10 of an upwardly-projecting hollow cylinder 11, which is slidably guided in a bearing 12 formed centrally in the air-motor cylinder cover 2, the air-motor piston 5a, which is slidable in a cylinder liner 1a, being fixed to the sleeve end.

The upper end of a hollow high pressure piston 13 is fixed in the lower end of the bore of a bridge piece 14 which extends across, and is thus detachably fixed between the upper ends of two vertical brackets 15 (see Figs. 1 and 6) which project upwards from the air-motor cylinder cover 2. The upper end of the bore 13a of the high pressure piston 13 opens into a chamber 16 which forms part of the said bore in the bridge piece and is closed at the top by a screwed plug 17. The said end of the bore is normally closed by a check valve 18 which is held on its seat by a coil spring 19 reacting between the valve and the plug 17. A lateral grease outlet 20 communicates with the chamber between the check valve 18 and the plug 17.

A hollow high pressure cylinder 21 is slidably arranged on the high pressure piston 13, its lower end being closed by a plug 22 and its upper end being formed with a flange 23 which is threaded externally and is screwed into an internally threaded retaining sleeve 24 fitted upon the upper end of the hollow cylinder 11 fixed at the upper end of the air-motor piston rod.

The upper end of the rod 25 (see Fig. 5) of a low pressure piston is screwed into the bottom end of the air-motor piston rod 5, and at its lower end it is integral with a disc-type low pressure piston 25a which is of conical section and is slidably arranged in the bore of the drum tube or low pressure cylinder 7. An axial passage 26 extends downwards from the top of the low pressure piston rod 25 to a transverse partition 27 separating the passage 26 from a lower axial passage 28 which extends downwards from the partition to the lower face 25b of the low pressure piston. At least one radial port 29 is formed in the low pressure piston rod 25 below the partition 27 to provide communication between the lower axial passage 28 and the exterior of the rod and at least one radial port 30 is formed in the low pressure piston rod above the partition and is adapted to provide communication between the upper axial passage 26 in the rod and the exterior of the rod.

A sleeve-type valve member 31 is slidably arranged upon the low pressure piston rod 24 and is normally forced downwards, so that its bottom end seats against the upper face of the low pressure piston 25a, by means of a light spring 32, which reacts between a shoulder 31a in the sleeve and a washer 33 slidably fitted on the air-motor piston rod 5, and a heavier spring 34 which reacts between the washer and an upper washer 35 which is fixed against movement upon the piston rod. The lower end of the valve sleeve 31 is slidable upon an enlargement 36 of the low pressure piston rod, an annular space 37 being formed between the sleeve valve and the reduced part of the piston rod below a shoulder 31b in the valve. Near its bottom end the sleeve valve is formed with at least one radial port 38, the purpose of which will be described hereinafter.

From the above description it will be understood that when the air-motor is reciprocated the low pressure piston 25a and its piston rod 25, the sleeve valve member 31, the air-motor piston rod 5 and the cylinder 11 attached to the upper end of the rod and the high pressure cylinder 21 are all reciprocated simultaneously, the high pressure cylinder sliding upwards and downwards over the high pressure piston 13.

Thus, towards the end of the upward stroke of the air-motor piston 5a grease is drawn into the lower end of the drum tube or low pressure cylinder 7 through the grease inlet ports 8 near the bottom end thereof. Towards the end of the downward stroke of the air-motor piston the low pressure piston 25a moves below the inlet ports 8 and grease is thus trapped between the piston and the closed bottom end 7a of the low pressure cylinder 7. The grease then passes upwards into the lower axial passage 28 in the low pressure piston rod and thence into the annular space 37 between the sleeve valve member 31 and the rod. This annular space constitutes a differential chamber in which the grease pressure acts to force the sleeve valve 31c upwards against the action of the lighter spring 32. The transverse partition 31c in the sleeve valve member thus uncovers the ports 30 in the low pressure piston rod 25 above the transverse partition 30, whereupon grease is transferred from the annular space through the ports 30 into the interior of the air-motor piston rod.

If the grease pressure exceeds a predetermined value, a further upward movement of the sleeve valve member 31 takes place and the upper end of the member contacts the slidable washer 33, and if the grease pressure is sufficiently high the stronger spring 34 will be compressed and the ports 38 in the valve member will be brought into alignment with the ports 29 in the low pressure piston rod 24 below the transverse partition 27 therein, whereupon excess grease will pass into the annular space around the said rod whence it is discharged back into the grease drum through the relief ports 9 in the drum tube or low pressure cylinder 7.

Thus, the low pressure piston 25a and the drum tube or low pressure cylinder 7 together act as a priming pump to lift grease from the bottom of the drum upwardly through the hollow air-motor piston rod 5. As previously mentioned, the high pressure piston 13 is fixed, so that on the downward stroke of the air-motor piston 5a, the high pressure cylinder 21 is drawn downwards along the piston until the ports 21a in the cylinder are below the piston, whereupon grease in the annular space 21b between the hollow cylinder 11 at the top of the air-motor piston rod and the high pressure cylinder 21 passes into the high pressure piston. This takes place when maximum pressure is developed in the priming pump and this pressure, combined with the partial vacuum produced in the high pressure cylinder 21, causes grease to flow into the high pressure piston 13.

Upon the commencement of the upward movement of the air-motor piston 5a, the ports 21a in the high pressure cylinder 21 are covered and further upward movement of the cylinder causes grease to be forced upwards through the high pressure piston 13, past the discharge check valve 18 into the bore 16 of the bridge piece 14 and thence into the grease outlet 20.

The supply of compressed air to the air-motor is controlled by two magnetically-operated air valves, one of which controls the supply of air to one end of the air-motor cylinder whilst the other controls the exhaust of air from the opposite end of the cylinder. The valves are caused to operate in such a manner that one admits air to its end of the air-motor cylinder whilst the other acts to allow air to be exhausted from the opposite end of the cylinder.

Figure 3:
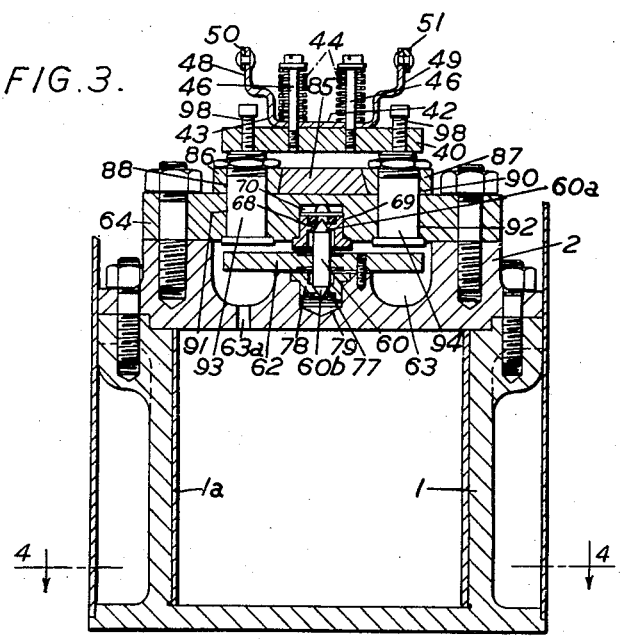
Fig. 3 is a section on the line 3—3 in Fig. 2, with the air cylinder of the pump shown in section.

Referring to Figs. 3, 5 and 7, the arrangement includes two flat control or short-circuiting armatures or bars 40 and 41 which are arranged on opposite sides of the axis of the air-motor cylinder 1. The bases 42 and 42a of actuating links 43 and 43a are mounted upon the top surfaces of the armatures and are held thereon respectively by two coil springs 44 and 45, the springs 44 being arranged around two screws 46 fixed in the armature 40 and the springs 45 around the screws 47 fixed in the armature 41. The link 43 has up-turned ends 48 and 49 (see Fig. 3) and the end 48 is pivotally connected to one end of a rocking beam 50 while the end 49 is pivotally connected to a second rocking beam 51, see Fig. 7. The rocking beams are pivotally supported between their ends by fulcrum pins 52 journalled in bearings formed in the upstanding-brackets 15 on the air-motor cylinder cover. The beams 50 and 51 are disposed substantially at right angles to the armatures 40 and 41 and they are respectively pivoted to upstanding links 53 and 54, the upper and lower ends of which are connected by cross bars 55 and 56 parallel to the armatures. The upper ends of the vertical links 53 and 54 are respectively connected to arms 57 and 58, the opposite ends of which are fixed to fulcrum pins 59 which are pivotally supported in bearings formed in the upstanding brackets 15.

Figure 2:
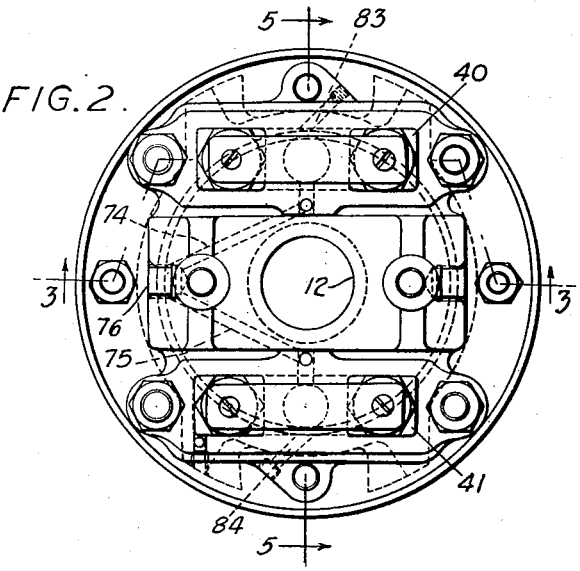
Fig. 2 is a plan view of the air-motor cylinder with the rocker and link gear removed.

The two air-control valves 60 and 61, Figs. 3 and 5, are arranged on opposite sides of the air-cylinder axis below the control armatures 40 and 41. The valve 60, which has two needle valve ends 60a and 60b, is fixed in a valve armature or bar 62 arranged in a chamber 63 which is formed in the air-motor cylinder cover 2 below a cover plate 64 fixed thereon, and is connected to the top end of the cylinder by a port 63a, Fig. 3. The valve 61, which has two needle valve ends 61a and 61b, is fixed in a valve armature or bar 65 arranged in a chamber 66 which is formed in the cylinder cover 2 below a cover plate 67 fixed thereto and is connected to the bottom end of the cylinder by a port 65a shown in Fig. 8. The upper end 60a of the valve 60 is adapted to open and close a valve seat 68 (see Fig. 3) formed in a hollow valve seat member 69 fitted in a cavity 70 formed in the cover plate 64. The upper end 61a of the valve 61 is adapted to open and close a valve seat 71 formed in the cover plate 67, the two cavities 70 and 73 being connected by air passages 74 and 75 to the main compressed-air inlet 76 (see Figs. 2 and 6). The bottom end 60b of the needle valve 60 is adapted to open and close a valve seat 77 formed in a hollow valve seat member 78 fitted in a cavity 79 in the air-motor cylinder cover 2.

The bottom end 61b of the needle valve 61 is adapted to open and close a valve seat 80 formed in a hollow valve seat member 81 fitted in a cavity 82 formed in the cover plate 2. The two cavities 79 and 82 are respectively connected by air passages 83 and 84 to exhaust.

Upon the cover plate 64 a permanent magnet 85 (see Figs. 3 and 7) is fixed between two iron blocks 86 and 87 which are formed respectively with holes 88 and 90 which are coaxial with holes 91 and 92 formed in the cover plate 64. Iron pole pieces or rods 93 and 94 are fixed respectively in the coaxial holes so that their inner ends are in the said chamber 63 in the air-motor cylinder cover 2. The pole pieces are arranged directly above the control valve actuating armature 62.

Upon the other cover plate 67, Fig. 7, a permanent magnet 95 is fixed between two iron blocks 96 and 97 which are formed respectively with holes (corresponding to the holes 88 and 90) which are coaxial with holes (corof said rods and into and out of contact therewith, said second bar upon contacting said other ends of said rods short circuiting the magnetic flux of said magnet means to thereby cause said first mentioned bar to move away from said one end of said rods under the action of said biasing means to cause the other of said valve members to block the chamber port it controls.

3. A fluid operated motor comprising a cylinder, a piston reciprocably mounted within said cylinder, a chamber formed in one of the cylinder walls, fluid inlet conduit means leading to said chamber, fluid exhaust conduit means leading from said chamber, further conduit means connecting said chamber with the interior of said cylinder on one side of said piston, and valve means for controlling fluid flow through said conduit means, said valve means comprising a valve member adapted to block said inlet conduit means, a second valve member adapted to block said exhaust conduit means, a magnetic bar secured to both of said valve members, a pair of magnetic rods mounted in said cylinder with one end of each extending into said chamber and positioned adjacent said bar, a permanent magnet positioned between said rods, said rods normally attracting said bar into contact with the ends thereof to cause one of said valve members to block the conduit means it controls, a second magnetic bar mounted adjacent the other end of each of said rods, said second bars being movable into contact with said other ends of said rods, and means for moving said second bar toward and away from said other ends of said rods, said second bar short circuiting the magnetic flux of said magnet to thereby cause said first mentioned bar to block the conduit means it controls.

4. A fluid operated motor comprising a cylinder, a piston reciprocable within said cylinder, a piston rod fixed to said piston and extending outwardly of one end of said cylinder, a chamber formed in said one end of said cylinder on each side of said piston rod, fluid inlet conduit means leading to one portion of each of said chambers, fluid exhaust conduit means leading from another portion of each of said chambers, further conduit means leading from each chamber to opposite sides of said piston, a magnetic bar positioned in each chamber between the respective portions thereof, valve means carried by said bar adapted to control the passage of fluid through said conduit means upon movement of the respective bars toward and away from the respective portions of said chambers, a pair of spaced magnetic rods extending into each chamber, said pairs of rods being mounted in said cylinder, with the inner ends of said rods being positioned adjacent the respective bars, magnet means positioned between the rods of each pair of rods, a magnetic bar mounted adjacent the outer ends of each of said pairs of rods and on either side of said piston rod, and means for alternately moving the respective last mentioned bars toward and away from the respective pairs of rods, and into and out of contact with the respective pairs of rods whereby the first mentioned bars are alternately moved into and out of contact with said rods to actuate said valve means, said second mentioned bars when in contact with the respective pairs of rods short circuiting the magnetic flux of the respective magnet means to release the respective first mentioned bars from said inner ends of the respective pairs of rods.

5. The fluid operated motor set forth in claim 4 wherein the last mentioned means comprises a pair of pivotally mounted rocker arms positioned on either side of said piston rod, one of the last mentioned bars being secured to one pair of adjacent ends of said rocker arms and the other of said last mentioned bars being secured to the other pair of adjacent ends of said rocker arms, and means for actuating said rocker arms upon predetermined movement of said piston rod whereby reciprocation of said piston rod causes pivoting movement of said rocker arms for moving the last mentioned bars toward and away from the outer ends of the respective pairs of rods.

6. The fluid operated motor set forth in claim 5 wherein resilient means is interposed between said second mentioned bars and the respective ends of said rocker arms.

7. A device of the type described comprising a cylinder, a piston reciprocating within said cylinder, a piston rod fixed to said piston and extending outwardly of one end of said cylinder, a chamber formed in said one end of said cylinder on each side of said piston rod, fluid inlet conduit means leading to a valve seat in one portion of each of said chambers, fluid exhaust conduit means leading from a valve seat in another portion of each of said chambers, said valve seats opposing each other in said chamber, further conduit means leading from each chamber to opposite sides of said piston, a magnetic bar positioned in each chamber between the said valve seats therein, each of said bars carrying valve means adapted to engage in the respective valve seats on movement of the respective bars toward the respective valve seats, means biasing the respective bars toward like valve seats, a pair of spaced magnetic rods extending into each chamber, said pairs of rods being mounted in said cylinder, with the inner ends of said rods being positioned adjacent the respective bars, magnet means positioned between the rods of each pair of rods, a magnetic bar mounted adjacent the outer ends of each of said pairs of rods, and on either side of said piston rod, a pair of rocker arms pivotally mounted on either side of said piston rod and extending between said second mentioned bars, said rocker arms being pivoted intermediate the ends thereof and being substantially perpendicular to said piston rod, means connecting the ends of said rocker arms to the respective second mentioned bars, a further arm pivoted to each rocker arm on one side of said piston rod, said further arms being connected at their ends by cross bars, said further arms being disposed substantially parallel to said piston rod, means for maintaining said further arms substantially parallel to said piston rod, said piston rod including abutment means adapted to engage said cross bars to rock said rocker arms on reciprocation of said piston rod, said rocker arms alternately moving the respective second bars into and out of contact with the outer ends of said rods, said second mentioned bars when in contact with the respective pairs of rods short circuiting the magnetic flux of said magnet means to release the respective first mentioned bars from said inner ends of the respective pairs of rods.

8. In a fluid operated motor having a cylinder and a double acting piston slidable therein, a piston rod attached to said piston, a pressure fluid inlet, a pressure fluid exhaust, means forming a first chamber permanently connected to said cylinder on one side of the cylinder axis, means forming a second chamber permanently connected to said cylinder on the opposite side of said cylinder axis, both of said chambers being adapted to be connected through passageways to said pressure fluid inlet and said pressure fluid exhaust, a first double ended control valve in said first chamber, a second double ended control valve in said second chamber, valve seats formed in each chamber and adapted to be engaged by said control valves, magnetic means comprising a magnet for controlling the operation of each of said control valves, a control valve armature carrying each control valve and adapted to be attracted to the magnet for the control valve, and means actuated through the movement of said motor piston for controlling the operation of said magnetic means, the arrangement being such that when one of said valves is in one of its operative positions, one of its valve ends allows pressure fluid to enter said cylinder on one side of said piston and its other valve end closes said cylinder on said same side of said motor piston to exhaust, while when said other valve is in a corresponding position, one of its valve ends allows pressure fluid to enter said cylinder on the opposite side of said piston and its other valve end responding to the holes 91 and 92) formed in the cover plate 65. Iron pole pieces or rods (corresponding to the pole pieces 93 and 94) are fixed respectively in the said holes in the cover plate 65 so that their inner ends are in the chamber 66 in the air-motor cylinder cover 2. The pole pieces are arranged directly above the control valve actuating armature 65.

The cross beams 50 and 51 are caused to rock by the engagement of the upper face of the securing-collar 24 at the upper end of the hollow cylinder 11 attached to the air-motor piston rod 5, with the upper cross bar 55 and by the engagement of the lower face of the collar with the lower cross bar 56. Thus, when the cross beams are rocked in one direction by the engagement of the collar 24 with the cross bar 55, the control armature 40 engages the two pole pieces 93 and 94 on one side of the axis of the air-motor cylinder, and the other control armature 41 is lifted off the other pole pieces.

When the cross beams 50 and 51 are rocked in the opposite direction by the engagement of the collar 24 with the cross bar 56, the control armature 41 engages the two pole pieces below it on the opposite side of the air-motor cylinder axis, and the armature 40 is lifted off the pole pieces 93 and 94.

The armatures 40 and 41 are guided in their up and down movements by pins 98 and 99 screwed into the pole pieces.

The two pole pieces associated with the valve-controlling armatures 62 and 65 attract the latter when the path of the magnetic flux is directed downwards. The force of attraction causes the upper end 60a or 61a of the air control valve 60 or 61 to be pulled on to its valve seat 69 or 71 whilst its lower end 60b or 61b is pulled off its seat 77 or 80 so that the inward flow of compressed air, say into the top end or bottom end of the air-motor cylinder 1, is stopped, and that end of the cylinder is connected to exhaust. Thus, when the valve control armature 62 is lifted against its pole pieces the supply of air to the cylinder space above the piston 5a is cut off while that space is opened to exhaust through the chamber 79 and simultaneously, upon the other valve control armature 65 being lowered from its pole pieces, air is supplied to the cylinder space below the piston 5a and that space is closed to exhaust. The reverse action takes place when the armature 65 is lifted and the armature 62 is lowered. Thus, it is only necessary to energise the pole pieces magnetically so as to bring about the reversal of the air control needle valves 60 and 61 and, conversely, when most of the magnetic flux is diverted away from each pair of pole pieces the valve-actuating armature associated with them drops away from the pole pieces under the force of the air pressure acting on the upper end of the needle valve. This diversion of the magnetic flux is brought about by permitting each control armature 40 or 41 (which acts as a short-circuiting armature) to rest upon the upper ends of the pole pieces above which it is arranged. This causes most of the flux to traverse the shorter and more permeable path through the short-circuiting armature and so weakens the flux in the valve-actuating armature 62 or 65 that the latter falls away from the pole pieces.

The control, or short-circuiting, armatures or bars 40 and 41 are attached to their actuating links by means of the spring-loaded screws 46 and 47 as previously mentioned, so that when the cross beams 50 and 51 are rocked, sufficient energy is stored in the springs to complete the upward travel of the control armatures as soon as their contact with the pole pieces has been broken, thus ensuring that the mechanism cannot stall in its movement in a "half-cocked" condition.

In the illustrated embodiment, the valve armatures or bars 62 and 65 are biased away from the inner ends of the pole pieces by gravity. Other appropriate biasing means could be employed without departing from the scope of the invention.

It will be understood that the air control valves 60 and 61 could be operated by electrically-excited magnets instead of by permanent magnets and that, in such a case, the valve reversal could be carried out by electrical switching instead of the mechanical operation of "short-circuiting armatures."

A packing or sealing ring 100 is fitted in a groove in the air-motor cylinder cover 2 around the hollow cylinder 11 attached to the top end of the air-motor piston rod 5, a packing or sealing ring 101 is also fitted in a groove in the air-motor piston 5a and a further packing or sealing ring 102 is fitted in the said downwardly-projecting boss 3 on the base of the air-motor cylinder around the air-motor piston rod. On each side of each of the rings 100, 101 and 102 annular felt washers 103, 104; 105, 106; and 107, 108 are respectively fitted in grooves, the arrangement being such that sufficient lubricant is retained by the felt rings to ensure that the surface of the sleeve 11, the piston rod and the bore of the air-motor cylinder shall be properly lubricated.

By removing the plug 17 from the bore of the bridge piece the check valve 18 may be inspected and by the removal of wing nuts 109 which hold the bridge piece 14 upon the above mentioned brackets 15, the high pressure piston 13 may be withdrawn. The high pressure cylinder 21 may also be removed by unscrewing the said retaining sleeve 24 on the hollow cylinder 11 attached to the air-motor piston rod. Thus, all the high pressure pump components are accessible without removing the pump from the grease drum.

I claim:

1. A device of the type described comprising a cylinder, a piston reciprocable in said cylinder, means forming a valve chamber, inlet conduit means leading to said chamber, exhaust conduit means leading from said chamber, said inlet and exhaust conduit means terminating in opposed valve seats formed in said chamber, further conduit means leading from said chamber to one side of said piston, a magnetic bar positioned between said valve seats, valve means carried by said bar for cooperation with the respective valve seats to block the respective conduit means when said bar is moved toward the respective seats, means biasing said bar toward one of said valve seats, and magnetic means for drawing said bar toward the other of said valve seats in opposition to the action of said biasing means, said magnetic means including magnetic flux conducting means positioned to attract said bar, magnet means for supplying sufficient magnetic flux to said flux conducting means to overcome said biasing means, and means for short circuiting said magnetic flux to permit said biasing means to draw said bar toward said one of said valve seats.

2. In combination, a cylinder, a piston reciprocable in said cylinder, said cylinder having a chamber formed in one of the walls thereof, fluid inlet conduit means leading to said chamber, fluid exhaust conduit means leading from said chamber, further conduit means connecting said chamber with the interior of said cylinder on one side of said piston, a magnetic bar positioned in said chamber between the chamber ports for said inlet and outlet conduit means, a first valve member adapted to block said chamber inlet port, a second valve member adapted to block said chamber outlet port, said valve members being secured to said bar, a pair of magnetic rods mounted in said cylinder with one end of each extending into said chamber and positioned adjacent said bar, means biasing said bar away from said one ends of said rods, magnet means positioned between said rods, said rods magnetically attracting said bar into contact with said one ends thereof to cause one of said valve members to block the chamber port it controls, a second magnetic bar mounted adjacent the other ends of each of said rods, said second bar being movable into contact with said other ends of said rods, and means for moving said second bar toward and away from said other ends closes said cylinder on said opposite side of said piston to exhaust, a reversal of flow of pressure fluid taking place when each valve is in its second operative position, said magnets comprising permanent magnets, each of which includes a set of pole pieces interposed between each magnet and its respective control valve armature, said armature being attracted toward said pole pieces in a direction to close said cylinder on opposite sides of said piston to pressure fluid admission and to open the same to exhaust, and means for diverting most of the magnetic flux away from said pole pieces so that said control valve armatures will fall away from said pole pieces.

9. A device as claimed in claim 8 wherein said flux diverting means comprises a short circuiting armature associated with each set of pole pieces.

10. A device as claimed in claim 9 wherein said means actuated through the movement of said piston comprises a rocker mechanism connected to said short circuiting armatures, and means for oscillating said rocker mechanism upon reciprocation of said piston, the arrangement being such that when said piston is moved in one direction, said rocker mechanism is oscillated in one direction and one of said armatures is caused to short circuit one of said sets of pole pieces and the other armature is moved out of short circuiting position, reverse movement of the armatures taking place when said rocker mechanism is oscillated in the opposite direction.

References Cited in the file of this patent

UNITED STATES PATENTS

| | | |
|---|---|---|
| 1,229,443 | Hall et al. | June 12, 1917 |
| 1,447,962 | Callaghan | Mar. 13, 1923 |
| 2,312,857 | Woelfer | Mar. 2, 1943 |
| 2,357,029 | Smith | Aug. 29, 1944 |

FOREIGN PATENTS

| | | |
|---|---|---|
| 474,072 | Great Britain | Oct. 20, 1937 |